(12) United States Patent
Thomas et al.

(10) Patent No.: US 10,935,098 B2
(45) Date of Patent: Mar. 2, 2021

(54) COIL SPRINGS WITH NON-LINEAR LOADING RESPONSES AND MATTRESSES INCLUDING THE SAME

(71) Applicant: Sealy Technology, LLC, Trinity, NC (US)

(72) Inventors: Darin Thomas, Salisbury, NC (US); Larry K. DeMoss, Greensboro, NC (US); Brian M. Manuszak, Thomasville, NC (US); David J. Pleiman, Peyton, CO (US); Mark J. Reisz, Rensselaer, IN (US); Randy Sizemore, Rensselaer, IN (US)

(73) Assignee: Sealy Technology, LLC, Trinity, NC (US)

( * ) Notice: Subject to any disclaimer, the term of this patent is extended or adjusted under 35 U.S.C. 154(b) by 0 days.

(21) Appl. No.: 16/825,609

(22) Filed: Mar. 20, 2020

(65) Prior Publication Data

US 2020/0217384 A1    Jul. 9, 2020

Related U.S. Application Data

(63) Continuation of application No. 15/160,807, filed on May 20, 2016, now Pat. No. 10,598,242.

(51) Int. Cl.
| | | |
|---|---|---|
| *F16F 1/04* | (2006.01) | |
| *A47C 27/06* | (2006.01) | |
| *F16F 1/08* | (2006.01) | |

(52) U.S. Cl.
CPC ............ *F16F 1/047* (2013.01); *A47C 27/064* (2013.01); *A47C 27/065* (2013.01); *F16F 1/08* (2013.01); *F16F 2230/105* (2013.01)

(58) Field of Classification Search
CPC .. F16F 1/047; F16F 1/08; A47C 27/04; A47C 27/06; A47C 27/064
See application file for complete search history.

(56) References Cited

U.S. PATENT DOCUMENTS

| 26,954 A | 1/1860 | Peck, Jr. |
| 44,793 A | 10/1864 | Fuller |
| (Continued) | | |

FOREIGN PATENT DOCUMENTS

| AU | 297805/01 | 6/2006 |
| AU | 2008219052 | 8/2008 |
| (Continued) | | |

OTHER PUBLICATIONS

Korean Intellectual Property Office, International Searching Authority, International Search Report and Written Opinion for PCT/US2017/032187, dated Aug. 10, 2017, 17 pages.

*Primary Examiner* — Eric J Kurilla
(74) *Attorney, Agent, or Firm* — Middleton Reutlinger (57) ABSTRACT

A spring is provided that exhibits a variable and non-linear loading response upon compression. The spring comprises a continuous wire having a lower end convolution, an upper end convolution, and a plurality of helical intermediate convolutions. The upper end convolution, the lower end convolution, and the helical intermediate convolutions each have a respective diameter, with the continuous wire further defining a pitch between the various convolutions. In the spring, one or more of the diameters of the convolutions or one or more of the pitches varies along the length of the continuous wire such that the spring exhibits a non-linear loading response upon compression. A mattress is further provided and includes a plurality of the springs arranged in a matrix.

9 Claims, 5 Drawing Sheets

(56) References Cited

U.S. PATENT DOCUMENTS

| | | | |
|---|---|---|---|
| 85,938 A | 1/1869 | Kirkpatrick | |
| 140,975 A | 7/1873 | Van Wert et al. | |
| 184,703 A | 11/1876 | Camp | |
| 274,715 A * | 3/1883 | Buckley | F16F 1/04 |
| | | | 267/180 |
| 374,658 A * | 12/1887 | Collom | F16F 1/04 |
| | | | 5/256 |
| 380,651 A | 4/1888 | Fowler et al. | |
| 399,867 A | 3/1889 | Gail et al. | |
| 409,024 A | 5/1889 | Wagner et al. | |
| 485,652 A | 11/1892 | Pfingst | |
| 569,256 A | 10/1896 | Van Cise | |
| D28,896 S | 6/1898 | Comstock | |
| 804,352 A | 11/1905 | Van Cise | |
| 859,409 A | 7/1907 | Radarmacher | |
| 1,025,489 A | 5/1912 | Thompson | |
| 1,211,267 A | 1/1917 | Young | |
| 1,250,892 A | 12/1917 | Johnson | |
| 1,254,314 A | 1/1918 | D'Arcy | |
| 1,284,384 A | 11/1918 | Lewis | |
| 1,337,320 A | 4/1920 | Karr | |
| 1,344,636 A | 6/1920 | Jackson | |
| 1,744,389 A | 1/1930 | Karr | |
| 1,751,261 A | 3/1930 | Wilson | |
| 1,798,885 A | 3/1931 | Karr | |
| 1,804,821 A | 5/1931 | Stackhouse | |
| 1,839,325 A | 1/1932 | Marquardt | |
| 1,879,172 A | 9/1932 | Gail | |
| 1,907,324 A | 5/1933 | Kirchner | |
| 1,938,489 A | 12/1933 | Karr | |
| 1,950,770 A | 3/1934 | Bayer | |
| 1,989,302 A | 1/1935 | Wilmot | |
| 2,054,868 A | 9/1936 | Schwartzman | |
| D109,730 S | 5/1938 | Powers | |
| 2,148,961 A | 2/1939 | Pleet | |
| 2,214,135 A | 9/1940 | Hickman | |
| 2,348,897 A | 5/1944 | Gladstone | |
| 2,480,158 A | 8/1949 | Owen | |
| 2,562,099 A | 7/1951 | Hilton | |
| 2,614,681 A | 10/1951 | Keil | |
| 2,577,812 A | 12/1951 | Samel | |
| 2,611,910 A | 9/1952 | Bell | |
| 2,617,124 A | 11/1952 | Johnson | |
| 2,681,457 A | 6/1954 | Rymland | |
| 2,889,562 A | 6/1959 | Gleason | |
| 2,972,154 A | 2/1961 | Raszinski | |
| 3,064,280 A | 11/1962 | Nachman | |
| 3,083,381 A | 4/1963 | Bailey | |
| 3,089,154 A | 5/1963 | Boyles | |
| 3,107,367 A | 10/1963 | Nachman | |
| 3,142,071 A | 7/1964 | Nachman | |
| 3,256,535 A | 6/1966 | Anson | |
| 3,430,275 A | 3/1969 | Janapol | |
| 3,517,398 A | 6/1970 | Patton | |
| 3,533,114 A | 10/1970 | Karpen | |
| 3,541,827 A | 11/1970 | Hansen | |
| 3,690,456 A | 9/1972 | Powers, Jr. | |
| 3,633,228 A | 11/1972 | Zysman | |
| 3,716,874 A | 2/1973 | Thomas, Jr. | |
| 3,735,431 A | 5/1973 | Zocco | |
| 3,751,025 A * | 8/1973 | Beery | F16F 1/08 |
| | | | 267/166.1 |
| D230,683 S | 3/1974 | Roe | |
| 3,869,739 A | 3/1975 | Klein | |
| 3,016,464 A | 11/1975 | Tyhanci | |
| 3,923,293 A | 12/1975 | Wiegand | |
| 3,938,653 A | 2/1976 | Senger | |
| 4,077,619 A | 3/1978 | Borlinghaus | |
| 4,111,407 A | 9/1978 | Stager | |
| 4,122,566 A | 10/1978 | Yates | |
| 4,160,544 A | 7/1979 | Higgins | |
| 4,164,281 A | 8/1979 | Schnier | |
| 4,257,151 A | 3/1981 | Coots | |
| 4,439,977 A | 4/1984 | Stumpf | |
| 4,519,107 A | 5/1985 | Dillon et al. | |
| 4,523,344 A | 6/1985 | Stumpf | |
| 4,533,033 A | 8/1985 | van Wegen | |
| 4,535,978 A | 8/1985 | Wagner | |
| 4,548,390 A | 10/1985 | Sasaki | |
| 4,566,926 A | 1/1986 | Stumpf et al. | |
| 4,578,834 A | 4/1986 | Stumpf et al. | |
| 4,609,186 A | 9/1986 | Thoenen et al. | |
| 4,664,361 A | 5/1987 | Sasaki | |
| 4,726,572 A | 2/1988 | Flesher et al. | |
| 4,781,360 A | 11/1988 | Ramsey et al. | |
| 4,817,924 A | 4/1989 | Thoenen et al. | |
| 4,960,267 A | 10/1990 | Scott et al. | |
| 5,040,255 A | 8/1991 | Barber | |
| 5,127,509 A | 7/1992 | Kohlen | |
| 5,127,635 A | 7/1992 | Long et al. | |
| 5,222,264 A | 6/1993 | Morry | |
| 5,310,167 A * | 5/1994 | Noll, Jr. | F16F 1/024 |
| | | | 267/166 |
| 5,319,815 A | 6/1994 | Stumpf et al. | |
| 5,363,522 A | 11/1994 | McGraw | |
| 5,444,905 A | 8/1995 | St. Clair | |
| 5,575,460 A | 11/1996 | Knoepfel et al. | |
| 5,584,083 A | 12/1996 | Ramsey et al. | |
| 5,701,623 A | 12/1997 | May | |
| 5,713,088 A | 2/1998 | Wagner et al. | |
| 5,720,471 A | 2/1998 | Constantinescu | |
| 5,724,686 A | 3/1998 | Neal | |
| 5,803,440 A | 9/1998 | Wells | |
| 5,832,551 A | 11/1998 | Wagner | |
| 5,868,383 A * | 2/1999 | Codos | B68G 9/00 |
| | | | 267/166.1 |
| D409,024 S | 5/1999 | Wagner et al. | |
| 6,134,729 A | 10/2000 | Quintile et al. | |
| 6,149,143 A | 11/2000 | Richmond et al. | |
| 6,155,310 A | 12/2000 | Haubert et al. | |
| 6,243,900 B1 | 6/2001 | Gladney et al. | |
| 6,256,820 B1 | 7/2001 | Moser et al. | |
| 6,260,223 B1 | 7/2001 | Mossbeck et al. | |
| 6,272,706 B1 | 8/2001 | McCune | |
| 6,315,275 B1 | 11/2001 | Zysman | |
| 6,318,416 B1 | 11/2001 | Grueninger | |
| 6,336,305 B1 | 1/2002 | Graf et al. | |
| 6,339,857 B1 | 1/2002 | Clayton | |
| 6,354,577 B1 | 3/2002 | Quintile et al. | |
| 6,375,169 B1 | 4/2002 | McCraw et al. | |
| 6,398,199 B1 | 6/2002 | Barber | |
| 6,408,469 B2 | 6/2002 | Gladney et al. | |
| 6,430,982 B2 | 8/2002 | Andrea et al. | |
| 6,467,240 B2 | 10/2002 | Zysman | |
| 6,481,701 B2 | 11/2002 | Kessen et al. | |
| 6,523,812 B1 | 2/2003 | Spinks et al. | |
| 6,540,214 B2 | 4/2003 | Barber | |
| 6,640,836 B1 | 11/2003 | Haubert et al. | |
| 6,659,261 B2 | 12/2003 | Miyakawa | |
| 6,698,166 B2 | 3/2004 | Zysman | |
| 6,758,078 B2 | 6/2004 | Wells et al. | |
| 6,772,463 B2 | 8/2004 | Gladney et al. | |
| 6,883,196 B2 | 4/2005 | Barber | |
| 6,931,685 B2 * | 8/2005 | Kuchel | A47C 23/002 |
| | | | 5/716 |
| 6,944,899 B2 | 9/2005 | Gladney | |
| 6,952,850 B2 | 10/2005 | Visser et al. | |
| 6,966,091 B2 | 11/2005 | Barber | |
| 7,044,454 B2 | 5/2006 | Colman et al. | |
| 7,048,263 B2 | 5/2006 | Ahlqvist | |
| 7,063,309 B2 | 6/2006 | Colman | |
| 7,086,425 B2 | 8/2006 | Widmer | |
| D527,932 S | 9/2006 | Eigenmann et al. | |
| D528,329 S | 9/2006 | Eigenmann et al. | |
| D528,330 S | 9/2006 | Eigenmann et al. | |
| D528,833 S | 9/2006 | Eigenmann et al. | |
| D530,120 S | 10/2006 | Eigenmann et al. | |
| D531,436 S | 11/2006 | Eigenmann et al. | |
| 7,168,117 B2 | 1/2007 | Gladney et al. | |
| 7,178,187 B2 | 2/2007 | Barman et al. | |
| 7,185,379 B2 | 3/2007 | Barman | |
| 7,219,381 B2 | 5/2007 | Damewood et al. | |
| 7,287,291 B2 | 10/2007 | Carlitz | |
| 7,386,897 B2 | 6/2008 | Eigenmann et al. | |

(56) References Cited

U.S. PATENT DOCUMENTS

| | | | |
|---|---|---|---|
| 7,404,223 B2 | 7/2008 | Manuszak et al. | |
| D579,242 S | 10/2008 | Kilic | |
| 7,578,016 B1 | 8/2009 | McCraw | |
| 7,748,065 B2 | 7/2010 | Edling | |
| D621,186 S | 8/2010 | DeMoss et al. | |
| 7,805,790 B2 | 10/2010 | DeMoss et al. | |
| 7,814,594 B2 | 10/2010 | DeFranks et al. | |
| 7,908,693 B2 | 3/2011 | DeMoss et al. | |
| 7,921,561 B2 | 4/2011 | Eigenmann et al. | |
| D651,828 S | 1/2012 | DeMoss et al. | |
| D652,235 S | 1/2012 | DeMoss et al. | |
| 8,157,084 B2 | 4/2012 | Begin et al. | |
| 8,230,538 B2 | 7/2012 | Moret et al. | |
| 8,720,872 B2 | 5/2014 | DeMoss et al. | |
| 8,783,447 B1 | 7/2014 | Yohe | |
| 8,857,799 B2 | 10/2014 | Tyree | |
| 8,895,109 B2 | 11/2014 | Cohen | |
| 8,978,183 B1 | 3/2015 | Richmond et al. | |
| 8,979,079 B2 | 3/2015 | DeFranks | |
| 9,060,616 B2 | 6/2015 | Cohen | |
| 9,085,420 B2 | 7/2015 | Williams | |
| 9,161,634 B2 * | 10/2015 | DeFranks | A47C 27/065 |
| 9,352,913 B2 | 5/2016 | Manuszak et al. | |
| 9,392,876 B2 | 7/2016 | Tyree | |
| 9,848,711 B2 * | 12/2017 | Kilgore | A47C 27/20 |
| 9,936,815 B2 | 4/2018 | DeMoss et al. | |
| 2001/0008030 A1 | 7/2001 | Gladney et al. | |
| 2001/0013147 A1 | 8/2001 | Fogel | |
| 2002/0125623 A1 * | 9/2002 | Kessen | F16F 1/04 267/221 |
| 2002/0139645 A1 | 10/2002 | Haubert et al. | |
| 2002/0152554 A1 | 10/2002 | Spinks et al. | |
| 2003/0093864 A1 | 5/2003 | Visser et al. | |
| 2003/0177585 A1 | 9/2003 | Gladney et al. | |
| 2004/0046297 A1 | 3/2004 | DeMoss et al. | |
| 2004/0074005 A1 | 4/2004 | Kuchel | |
| 2004/0079780 A1 | 4/2004 | Kato | |
| 2004/0133988 A1 | 7/2004 | Barber | |
| 2004/0158929 A1 * | 8/2004 | Gladney | A47C 23/043 5/716 |
| 2004/0237204 A1 | 12/2004 | Antinori | |
| 2004/0261187 A1 | 12/2004 | Van Patten | |
| 2005/0246839 A1 | 11/2005 | Niswonger | |
| 2006/0042016 A1 * | 3/2006 | Barman | A47C 23/043 5/716 |
| 2007/0017033 A1 | 1/2007 | Antinori | |
| 2007/0017035 A1 | 1/2007 | Chen et al. | |
| 2007/0094807 A1 | 5/2007 | Wells | |
| 2007/0101507 A1 | 5/2007 | Grothaus | |
| 2007/0124865 A1 | 6/2007 | Stjerma | |
| 2007/0169275 A1 | 7/2007 | Manuszak et al. | |
| 2007/0220680 A1 | 9/2007 | Miller et al. | |
| 2007/0220681 A1 | 9/2007 | Gladney et al. | |
| 2007/0235915 A1 * | 10/2007 | Ahn | A47C 27/07 267/167 |
| 2007/0289068 A1 | 12/2007 | Edling | |
| 2008/0017255 A1 | 1/2008 | Petersen | |
| 2008/0017271 A1 | 1/2008 | Haltiner | |
| 2008/0115287 A1 | 5/2008 | Eigenmann et al. | |
| 2009/0193591 A1 | 8/2009 | DeMoss et al. | |
| 2009/0261518 A1 * | 10/2009 | DeFranks | A47C 27/065 267/166 |
| 2010/0180385 A1 | 7/2010 | Petrolati et al. | |
| 2010/0212090 A1 | 8/2010 | Stjerma | |
| 2010/0257675 A1 * | 10/2010 | DeMoss | A47C 27/064 5/720 |
| 2011/0148018 A1 | 6/2011 | Defranks et al. | |
| 2012/0112396 A1 | 5/2012 | Defranks et al. | |
| 2014/0103903 A1 * | 4/2014 | Nakamura | A61B 5/04085 324/76.11 |
| 2014/0291116 A1 | 10/2014 | Williams | |
| 2014/0373280 A1 | 12/2014 | Mossbeck et al. | |
| 2015/0084251 A1 | 3/2015 | Ahn | |
| 2015/0359349 A1 * | 12/2015 | Eigenmann | A47C 23/043 5/655.8 |
| 2016/0029809 A1 * | 2/2016 | Shive | A47C 27/05 5/718 |
| 2016/0270545 A1 * | 9/2016 | Codos | A47C 27/05 |
| 2016/0316927 A1 | 11/2016 | Thomas et al. | |
| 2017/0050486 A1 * | 2/2017 | Sayama | B60G 11/14 |
| 2017/0290438 A1 * | 10/2017 | Navarra | A47C 27/064 |
| 2017/0335914 A1 * | 11/2017 | Thomas | A47C 27/065 |
| 2018/0027983 A1 * | 2/2018 | DeMoss | A47C 27/064 |
| 2018/0368585 A1 * | 12/2018 | DeMoss | F16F 1/028 |
| 2019/0000239 A1 | 1/2019 | Thomas et al. | |

FOREIGN PATENT DOCUMENTS

| | | |
|---|---|---|
| BR | 0115070-7 | 11/2001 |
| CA | 2430330 | 9/2007 |
| CN | 1682040 | 10/2005 |
| CN | 01819332.3 | 12/2005 |
| EM | 001620725-0001 | 10/2009 |
| EP | 1527715 A1 | 5/2005 |
| EP | 1337357 | 9/2006 |
| EP | 1784099 | 5/2007 |
| EP | 2112896 | 11/2009 |
| GB | 494428 | 10/1938 |
| GB | 2215199 A | 9/1989 |
| JP | 4084750 | 2/2008 |
| JP | 5710124 | 3/2015 |
| KR | 10-0730278 | 6/2007 |
| MX | 238076 | 6/2006 |
| MX | 314236 | 10/2013 |
| NZ | 525792 | 3/2005 |
| NZ | 579217 | 9/2011 |
| NZ | 587211 | 6/2013 |
| PT | 1337357 | 9/2006 |
| SG | 98527 | 7/2005 |
| TW | 512085 | 12/2002 |
| WO | 2008143595 | 11/2008 |
| WO | 2017116405 | 6/2017 |
| WO | 2017116406 | 7/2017 |
| WO | 20170127082 | 7/2017 |
| WO | 2018118037 | 1/2018 |
| WO | 2018118035 | 6/2018 |
| ZA | 2003/03457 | 7/2004 |
| ZA | 2005/01090 | 10/2006 |

\* cited by examiner

COIL SPRINGS WITH NON-LINEAR LOADING RESPONSES AND MATTRESSES INCLUDING THE SAME

CLAIM TO PRIORITY

This continuation patent application claims priority to and benefit, under 35 U.S.C. § 120, of U.S. Non-Provisional patent application Ser. No. 15/160,807, titled "Coil Springs with Non-Linear Loading Responses and Mattresses Including the Same", filed May 20, 2016, all of which is incorporated by reference herein.

TECHNICAL FIELD

The present invention relates to coil springs and mattresses including coil springs. In particular, the present invention relates to coil springs that are comprised of a continuous wire and that exhibit a variable and non-linear loading response when compressed.

BACKGROUND

Typically, when a uniaxial load is applied to a spring, the spring exhibits a linear compression rate. That is to say, it takes twice as much force to compress a typical spring two inches as it does to compress the same spring one inch. The linear response of springs is expressed by Hooke's law which states that the force (F) needed to extend or compress a spring by some distance (D) is proportional to that distance. This relationship is expressed mathematically as F=kD, where k represents the spring constant for a particular spring. A high spring constant indicates that the spring requires more force to compress, and a low spring constant means the spring requires less force to compress.

Linear response springs, such as wire coil springs, are commonly used as mattress innersprings in combination with padding and upholstery that surround the innersprings. Most mattress innersprings are comprised of an array of wire coil springs which are often adjoined by lacing end convolutions of the coil springs together with cross wires. An advantage of this arrangement is that it is inexpensive to manufacture. However, this type of innerspring often provides a firm and rigid mattress surface.

An alternative to an innerspring mattress is a mattress constructed of one or more foam layers. Unlike an innerspring mattress comprised of an array of wire coil springs, foam mattresses exhibit a non-linear response to forces applied to the mattress. In particular, a foam mattress provides more support as the load increases. For instance, a typical foam mattress provides increased support after it has been compressed approximately 60% of the maximum compression of the foam. The non-linear response of foam mattresses provides improved sleep comfort for a user. However, the mechanical properties of certain foam may degrade over time affecting the overall comfort of the foam mattress. Furthermore, foam mattresses are often more costly to produce than metal spring mattresses.

SUMMARY

The present invention includes coil springs and mattresses including coil springs. In particular, the present invention includes coil springs that are comprised of a continuous wire and that exhibit a variable and non-linear loading response when compressed. Thus, the coil springs of the present invention provide a user with the non-linear support typically seen in a foam mattress, but through the use of springs.

In one exemplary embodiment of the present invention, a coil spring is provided that is comprised of a continuous wire having a length and forming a plurality of convolutions. In particular, the continuous wire of the coil spring forms an upper end convolution, a lower end convolution opposite the upper end convolution, and five helical intermediate convolutions. The upper end convolution of the continuous wire forms a substantially closed circular loop at the topmost portion of the continuous wire, while the lower end convolution similarly forms a substantially closed circular loop at the lowermost portion of the continuous wire. In this way, the coil spring thus terminates at either end in a generally planar form that serves as the supporting end structures of the coil spring, while the five helical intermediate convolutions helically spiral between the lower end convolution and the upper end convolution.

In the exemplary coil spring, the upper end convolution, the helical intermediate convolutions, and the lower end convolution of the exemplary coil spring are arranged such that coil spring is generally divided into a lower portion and an upper portion. The lower portion of the coil spring includes the lower end convolution, the first intermediate convolution, the second intermediate convolution, and the third intermediate convolution formed by the continuous wire, while the upper portion includes the fourth intermediate convolution and the fifth intermediate convolution as well as the upper end convolution formed by the continuous wire.

In the coil spring, to provide a non-linear loading response, the diameter of the fourth helical intermediate convolution and the diameter of the fifth helical intermediate convolution in the upper portion of the coil spring are substantially equal to one another and to the third helical intermediate convolution, the second helical intermediate convolution, the first helical intermediate convolution, and the lower end convolution. The diameter of the upper end convolution is less than any of the helical intermediate convolutions and the lower end convolution, but does not considerably affect the overall feel of the spring despite the smaller diameter of the upper end convolution. More significant to the overall feel of the coil spring, however, and to provide a softer feel upon an initial compression and a firmer feel upon subsequent or continued compression, the pitch between the lower end convolution and the first helical intermediate convolution, the pitch between the first helical intermediate convolution and the second helical intermediate convolution, and the pitch between the second helical intermediate convolution and the third helical intermediate convolution are each greater than the pitch between the third helical intermediate convolution and the fourth helical intermediate convolution, the pitch between the fourth helical intermediate convolution and the fifth helical intermediate convolution, and the pitch between the fifth helical intermediate convolution and the upper end convolution. Each of the pitches between the helical intermediate convolutions in the lower portion of the coil spring do decrease slightly as the coil spring extends from the lower end convolution to the third intermediate convolution, and then transitions to the fourth intermediate convolution, where the pitch between the fourth intermediate convolution and the fifth intermediate convolution decreases significantly as compared to the pitches between the helical intermediate convolutions in the lower portion of the coil spring. Nevertheless, each of the pitches between the helical intermediate convolutions in the lower portion are still larger than the pitch between the fourth helical intermediate convolution and the fifth helical intermediate convolution as well as the pitch between the fifth helical intermediate convolution and the upper end convolution. As such, the spring constant of the upper portion of the coil spring is less than the spring constant of the lower portion of the coil spring.

Upon compression of the exemplary coil spring a predetermined distance, all of the helical intermediate convolutions in the upper portion are thus the first to become fully compressed and in contact with one another. Furthermore, the fourth intermediate convolution becomes in contact with the third intermediate convolution. In this way, each of the helical intermediate convolutions in the upper portion is consequently not able to compress any further and each of the helical intermediate convolutions in the upper portion is thus deactivated. By comparison, upon such an initial compression, each of the helical intermediate convolutions in the lower portion is still capable of additional compression. Further compression of the coil spring will, of course, result in compression of the helical intermediate convolutions that form the lower portion. In doing so, however, and by deactivating the "softer" upper portion of the coil spring, the spring constant of the coil spring, which was originally based on both the upper portion and the lower portion of the coil spring, will increase to a point where the spring constant of the coil spring is approximately equal to the spring constant of just the "harder" lower portion of the coil spring, thus providing the variable loading response in the coil spring.

In another exemplary embodiment of the present invention, another coil spring is provided that also exhibits a variable loading response. The additional coil spring is also comprised of a continuous wire having a lower end convolution, an upper end convolution opposite the lower end convolution, and five intermediate convolutions that helically spiral between the lower end convolution and the upper end convolution. However, the five intermediate convolutions in the additional coil spring do not include diameters that are substantially equal to one another. Rather, in the additional coil spring, the helical intermediate convolutions are divided into a first portion of helical intermediate convolutions having a first diameter and a second portion of helical intermediate convolutions having a second diameter that is less than the first diameter. In particular, in the additional coil spring, the first portion of helical intermediate convolutions includes the first helical intermediate convolution, the third helical intermediate convolution, and the fifth helical intermediate convolution of the coil spring, where the diameters of the first helical intermediate convolution, the third helical intermediate convolution, and the fifth helical intermediate convolution are substantially equal to one another. The second portion of helical intermediate convolutions then includes the second helical intermediate convolution and the fourth helical intermediate convolution of the coil spring, where the diameters of the second helical intermediate convolution and the fourth helical intermediate convolution are not only equal to one another, but are also equal to the diameter of the lower end convolution and the upper end convolution of the coil spring. In this way, each of the helical intermediate convolutions included in the first portion of helical intermediate convolutions are thus arranged in an alternating pattern with each of the helical intermediate convolutions in the second portion of helical intermediate convolutions and with the lower end convolution and the upper end convolution.

In the additional coil spring, due to the larger diameters, each of the helical intermediate convolutions included in the first portion of helical intermediate convolutions has a spring constant that is less than the spring constant of each of the helical intermediate convolutions in the second portion of helical intermediate convolutions. As such, when the coil spring is compressed a predetermined distance, each helical intermediate convolution included in the first portion of helical intermediate convolutions will be the first of the helical intermediate convolutions in the coil spring to become deactivated, while each of the helical intermediate convolutions in the second portion will still be capable of additional compression. In other words, by including such an arrangement of alternating helical intermediate convolutions in the additional coil spring, upon compression, the coil spring will also exhibit a variable loading response.

In another exemplary embodiment of the present invention, a further coil spring is provided that is again comprised of a continuous wire forming a lower end convolution, an upper end convolution opposite the lower end convolution, and five intermediate convolutions, which helically spiral between the lower end convolution and the upper end convolution. Unlike the coil springs described above, however, the lower end convolution, the upper end convolution, and the five intermediate convolutions of the further coil spring are arranged such that the coil spring is divided into a lower portion that includes the lower end convolution and the first intermediate convolution, a central portion which includes the second intermediate convolution and the third intermediate convolution, and an upper portion that includes the fourth intermediate convolution, the fifth intermediate convolution, and the upper end convolution. The diameters of the lower end convolution and first helical intermediate convolution of the lower portion, the diameters of the second helical intermediate convolution and the third helical intermediate convolution of the central portion, and the diameters of the fourth intermediate convolution, the fifth intermediate convolution, and the upper end convolution of the upper portion are all substantially equal to one another. However, in the further exemplary coil spring, the pitch between the lower end convolution and the first helical intermediate convolution, the pitch between the first helical intermediate convolution and the second helical intermediate convolution, the pitch between the fourth helical intermediate convolution and the fifth helical intermediate convolution, and the pitch between the fifth helical intermediate convolution and the upper end convolution are substantially equal to one another, while the pitch between the second helical intermediate convolution and the third helical intermediate convolution is substantially smaller. Accordingly, when the coil spring is compressed a predetermined distance, the central portion of the coil spring will initially become deactivated, while the upper portion and the lower portion of the coil spring are still capable of additional compression, which, in turn, leads to a variable loading response in the coil spring upon compression.

Each of the coil springs of the present invention can also be enclosed by a fabric pocket to thereby form a pocketed coil spring. For example, in some embodiments, a pocketed coil spring is provided that includes an exemplary coil spring of the present invention and a flexible enclosure that encloses the continuous wire forming the exemplary coil spring. The flexible enclosure includes a bottom wall positioned adjacent to the lower end convolution of the coil spring, a top wall positioned adjacent to the upper end convolution of the coil spring, and a continuous side wall that extends from the bottom wall to the top wall, such that the continuous side wall surrounds the intermediate convolutions of the coil spring. To this end, the diameter of the lower end convolution, the diameter of one or more of the helical intermediate convolutions, and/or the diameter of the upper end convolution is generally substantially the same as the diameter of the flexible enclosure. As such, upon gluing or otherwise connecting the side wall of the flexible enclosure to one or more of the convolutions, an adequate connection is provided between the coil spring and the flexible enclosure, and the flexible enclosure does not shift its position relative to the coil spring when the pocketed coil spring is compressed.

Regardless of the particular configuration of the exemplary coil springs or pocketed coil springs of the present invention, in some embodiments, each of the coil springs, including each of the pocketed coil springs described herein, can further be included in a mattress to provide a user with the non-linear support typically seen in a foam mattress, but through the use of coil springs. For example, in some embodiments of the present invention, a mattress is provided that includes a plurality of the pocketed coil springs described herein above. The pocketed coil springs included in the mattress are arranged in a matrix, such that the upper end convolution formed by the continuous wire comprising the coil springs defines a first support surface, and the lower end convolution formed by the continuous wire defines a second support surface opposite the first support surface. The mattress also comprises an upper body supporting layer positioned adjacent to the first support surface, along with a lower foundation layer positioned adjacent to the second support surface. Furthermore, a sidewall extends between the upper body supporting layer and the lower foundation layer, and around the entire periphery of the two layers, such that the matrix of pocketed coil springs is completely surrounded.

Further features and advantages of the present invention will become evident to those of ordinary skill in the art after a study of the description, figures, and non-limiting examples in this document.

DESCRIPTION OF EXEMPLARY EMBODIMENTS

The present invention includes coil springs and mattresses including coil springs. In particular, the present invention includes coil springs that are comprised of a continuous wire and that exhibit a variable and non-linear loading response when compressed. Thus, the coil springs of the present invention provide a user with the non-linear support typically seen in a foam mattress, but through the use of coil springs.

Figure 1:
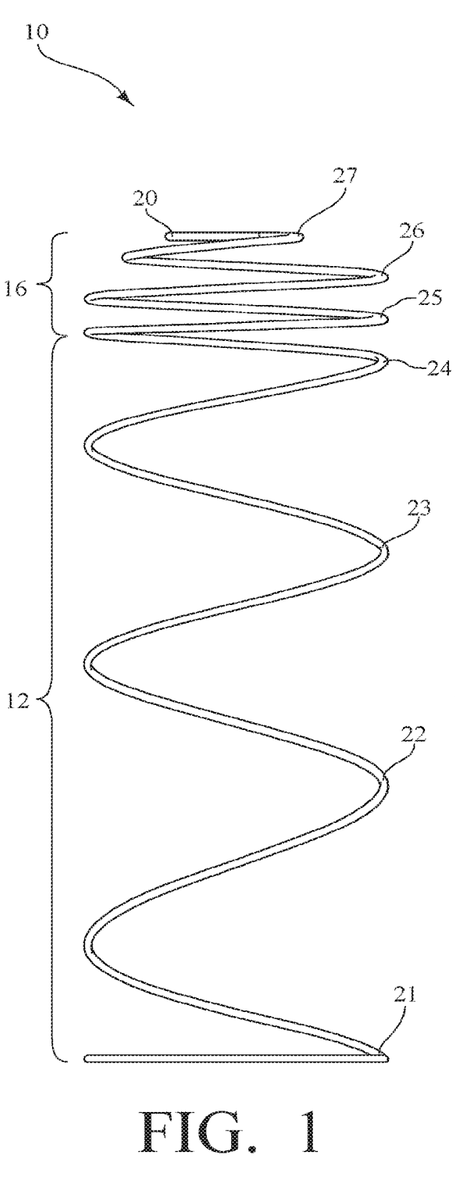
FIG. 1 is a side view of an exemplary coil spring made in accordance with the present invention.

Referring first to FIG. 1, in one exemplary embodiment of the present invention, a coil spring 10 is provided that is comprised of a continuous wire 20 having a length and forming a plurality of convolutions of the coil spring 10 that are each made up of a portion of the continuous wire 20 substantially equal to about one turn of the continuous wire 20 (i.e., about 360° of the helical path of the continuous wire 20). In particular, the continuous wire 20 of the coil spring forms an upper end convolution 27, a lower end convolution 21 opposite the upper end convolution 27, and five helical intermediate convolutions 22-26. The upper end convolution 27 of the continuous wire 20 forms a substantially closed circular loop at the topmost portion of the continuous wire 20, while the lower end convolution 21 similarly forms a substantially closed circular loop at the lowermost portion of the continuous wire 20. In this way, the coil spring 10 thus terminates at either end in a generally planar form that serves as the supporting end structures of the coil spring 10, while the five helical intermediate convolutions 22-26 helically spiral between the lower end convolution 21 and the upper end convolution 27.

With further respect to the continuous wire 20, the upper end convolution 27, the helical intermediate convolutions 22-26, and the lower end convolution 21 of the exemplary coil spring 10 are arranged such that the coil spring 10 is generally divided into a lower portion 12 and an upper portion 16. The lower portion 12 of the coil spring 10 includes the lower end convolution 21, the first intermediate convolution 22, the second intermediate convolution 23, and the third intermediate convolution 24 (i.e., the three bottommost helical intermediate convolutions 22-24) formed by the continuous wire 20. The upper portion 16 of the coil spring 10 then includes the fourth intermediate convolution 25 and the fifth intermediate convolution 26 (i.e., the two uppermost intermediate convolutions 25-26) formed by the continuous wire 20, along with the upper end convolution 27.

As also shown in FIG. 1, by forming the coil spring 10 from a continuous wire 20, the upper end convolution 27 has a diameter, the lower end convolution 21 has a diameter, and each of the helical intermediate convolutions 22-26 has a respective diameter. In this regard, the continuous wire 20 further defines a pitch between each one of the plurality of intermediate convolutions 22-26, a pitch between the upper end convolution 27 and the fifth helical intermediate convolution 26 adjacent the upper end convolution 27, and a pitch between the lower end convolution 21 and the first helical intermediate convolution 22 adjacent to the lower end convolution 21.

With respect to the pitch between the convolutions and the diameter of convolutions in an exemplary coil spring of the present invention, in most coil springs formed using helically-spiraling continuous wire, the spring constant and resultant feel of the coil spring are typically determined by the gauge of the wire forming the coil spring, the total number of convolutions in the coil spring, the size of the convolutions (diameter), and the pitch or vertical spacing (or pitch angle) between the convolutions. In this regard, the pitch (or vertical spacing) between each convolution of a coil spring is typically controlled by the rate at which the continuous wire, which forms the coil spring, is drawn through a forming die in a coil-forming machine. Once formed, a larger pitch will typically produce a stiffer coil spring due to the increased vertical orientation of the wire, while a smaller pitch will typically produce a softer coil spring and allow for a larger number of total convolutions in the coil body. Similarly, larger diameter convolutions in a coil spring also contribute to a lower spring constant and consequentially softer feel than smaller diameter convolutions in coil springs. Of course, because the wire forming the coil spring is continuous, there is generally no defined beginning point or ending point of any single convolution. Furthermore, the diameter and pitch is typically adjusted gradually between one portion of the spring to another. As such, oftentimes a single convolution of a coil spring may not have just one single diameter or just one single pitch, but may include, for example, a beginning or end portion with a variable diameter and/or pitch that transitions to the adjacent convolution. Therefore, as used herein, the diameter and pitch of a convolution will typically refer to an average diameter and pitch, but can also be inclusive of a maximum diameter and pitch or a minimum diameter and pitch.

In the exemplary coil springs of the present invention described herein, the wire gauge of the coil springs generally has a standard range of about 10 awg to about 20 awg, which includes, in some embodiments, a range of about 11 awg to about 17 awg, and, in other embodiments, a range of about 12 awg to about 16 awg. By varying the diameters, the pitches, or both the diameters and the pitches included in the exemplary coil springs of the present invention, however, a variable and non-linear loading response is provided where a first spring constant provides a softer feel as the spring is initially compressed and a second spring constant provides a firmer feel as the compression of the coil spring increases. In other words, by forming the continuous wire of an exemplary coil spring of the present invention in a manner where at least one of the pitches is different than another one of the pitches, where at least one of the diameters of the convolutions is different from another one of the diameters of the convolutions, or a combination thereof, an exemplary coil spring can be configured to provide support similar to that observed in foam mattresses (i.e., where increased support is observed after the foam has been compressed an initial predetermined distance).

Referring now to FIG. 1, in the coil spring 10 the diameter of the fourth helical intermediate convolution 25 and the diameter of the fifth helical intermediate convolution 26 in the upper portion 16 of the coil spring 10 are substantially equal to one another and to the third helical intermediate convolution 24, the second helical intermediate convolution 23, the first helical intermediate convolution 22 and the lower end convolution 21. In particular, in the exemplary coil spring 10 shown in FIG. 1, the diameters of the lower end convolution 21, the first helical intermediate convolution 22, the second helical intermediate convolution 23, the third helical intermediate convolution 24, the fourth helical intermediate convolution 25 and the fifth helical intermediate convolution 26 are about 60 mm. The diameter of the upper end convolution 27 is less than any of the helical intermediate convolutions 22-26 and the lower end convolution 21, but does not considerably affect the overall feel of the coil spring 10 despite the smaller diameter of the upper end convolution 27.

Rather, to provide a non-linear loading response, what is more significant to the overall feel of the coil spring 10 and, in particular, to provide a softer feel upon an initial compression and a firmer feel upon subsequent or continued compression, the pitch between the lower end convolution 21 and the first helical intermediate convolution 22, the pitch between the first helical intermediate convolution 22 and the second helical intermediate convolution 23, and the pitch between the second helical intermediate convolution 23 and the third helical intermediate convolution 24 are each greater than the pitch between the third helical intermediate convolution 24 and the fourth helical intermediate convolution 25, the pitch between then fourth helical intermediate convolution 25 and the fifth helical intermediate convolution 26, and the pitch between the fifth helical intermediate convolution 26 and the upper end convolution 27. In particular, in the exemplary coil spring 10 shown in FIG. 1, the pitch between the lower end convolution 21 and the first helical intermediate convolution 22, the pitch between the first helical intermediate convolution 22 and the second helical intermediate convolution 23, and the pitch between the second helical intermediate convolution 23 and the third helical intermediate convolution 24 are each about 60 mm. By comparison, the pitch between the third helical intermediate convolution 24 and the fourth helical intermediate convolution 25, the pitch between the fourth helical intermediate convolution 25 and the fifth helical intermediate convolution 26, and the pitch between the fifth helical intermediate convolution 26 and the upper end convolution 27 are each about 10 mm.

It is contemplated that the pitch between the lower end convolution 21 and the first helical intermediate convolution 22 can be slightly less than the pitch between the pitch between the first helical intermediate convolution 22 and the second helical intermediate convolution 23 as the continuous wire 20 of the coil spring 10 transitions from the generally planar lower end convolution 21 to the helically spiraling first helical intermediate convolution 22. Similarly, the pitch between the fifth helical intermediate convolution 26 and the upper end convolution 27 can be slightly less than the pitch between the fourth helical intermediate convolution 25 and the fifth helical intermediate convolution 26 as the continuous wire 20 of the coil spring 10 transitions from the helically spiraling fifth helical intermediate convolution 26 to the generally planar upper end convolution 27. Furthermore, the pitch between the fourth intermediate convolution 25 and the fifth intermediate convolution 26 decreases significantly as compared to the pitches between the helical intermediate convolutions 22-24 in the lower portion 12 of the coil spring 10. Nevertheless, the pitch between the lower end convolution 21 and the first helical intermediate convolution 22 and each of the pitches between the helical intermediate convolutions 22-24 in the lower portion 12 are still larger than the pitches between the fourth helical intermediate convolution 25 and the fifth helical intermediate convolution 26 as well as between the fifth helical intermediate convolution 26 and the upper end convolution 27. As such, the spring constant of the upper portion 16 of the coil spring 10 is less than the spring constant of the lower portion 12 of the coil spring 10.

Figure 2:
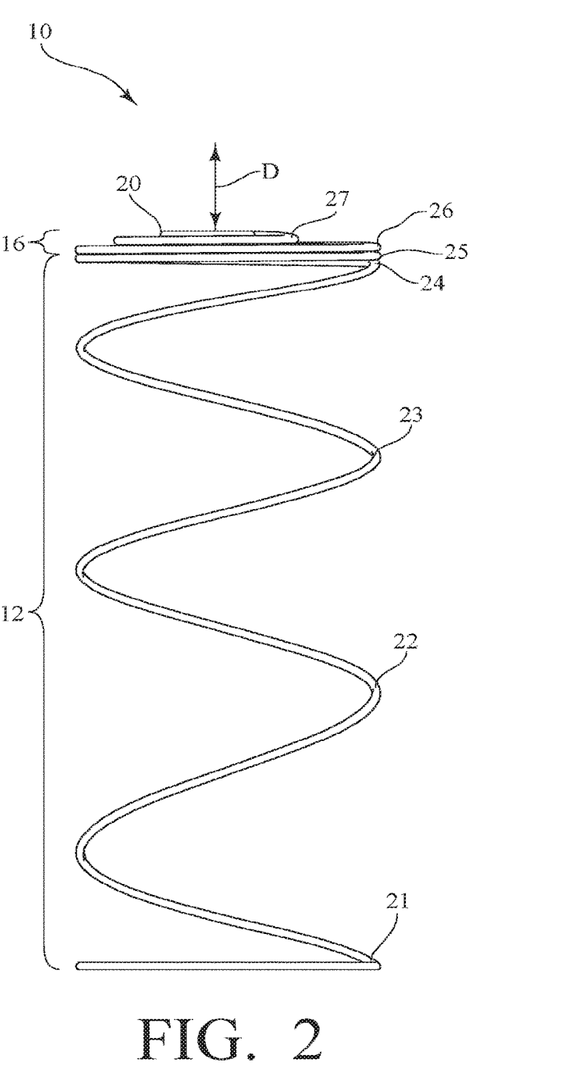
FIG. 2 is a side view of the exemplary coil spring of FIG. 1, but showing the coil spring compressed a predetermined distance, D.

With respect to the compression of the coil spring 10, and referring now specifically to FIG. 2, upon compression of the coil spring 10 a predetermined distance D, all of the helical intermediate convolutions 25-26 in the upper portion 16 become fully compressed and are in contact with each other. In particular, the exemplary coil spring 10 shown in FIG. 1 has an uncompressed height of about 180 mm, but the same exemplary coil spring 10 shown in FIG. 2 has been compressed about 30 mm such that the coil spring 10 has a compressed height of about 150 mm. As shown in FIG. 2, the fourth intermediate convolution 25 is also in contact with the third intermediate convolution 24. In this way, each of the helical intermediate convolutions 25-26 in the upper portion 16 become unable to compress any further and each of the helical intermediate convolutions 25-26 in the upper portion 16 thus become deactivated. By comparison, upon such an initial compression, each of the helical intermediate convolutions 22-24 in the lower portion 12 is still capable of additional compression. Although not shown in FIG. 2, further compression of the coil spring 10 will, of course, result in compression of the helical intermediate convolutions 22-24 that form the lower portion 12. In doing so, however, and by deactivating the "softer" upper portion 16 of the coil spring 10, the spring constant of the coil spring 10, which was originally based on both the upper portion 16 and the lower portion 12 of the coil spring 10, will increase to a point where the spring constant is approximately equal to the spring constant of just the "harder" lower portion 12 of the coil spring 10, thus providing the variable loading response in the coil spring 10.

Figure 3:
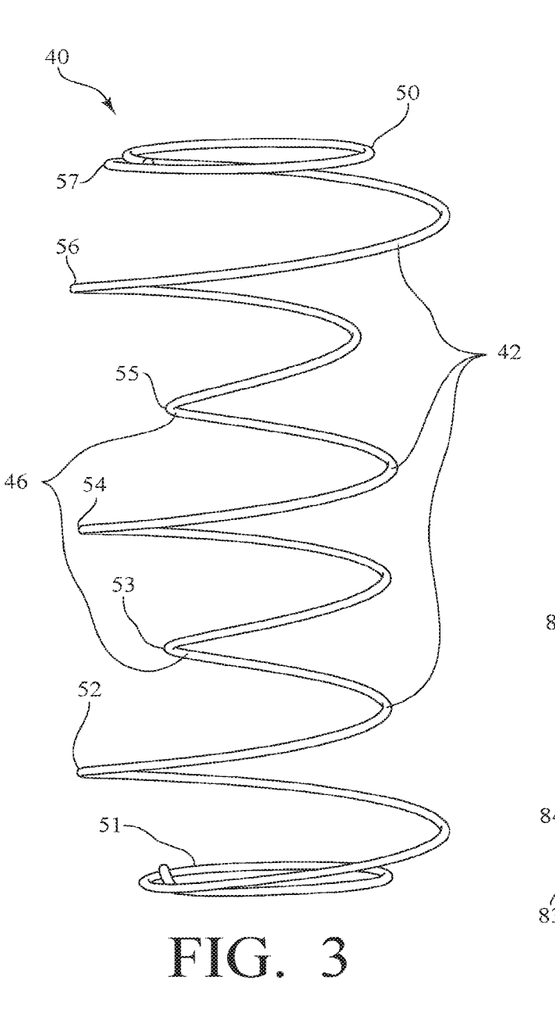
FIG. 3 is a perspective view of another exemplary coil spring made in accordance with the present invention.

As a refinement to the coil springs of the present invention, and referring now to FIG. 3, in another exemplary embodiment of the present invention, a coil spring 40 is provided that also exhibits a variable loading response. Like the coil spring 10 shown in FIG. 1, the coil spring 40 is comprised of a continuous wire 50 having a lower end convolution 51, an upper end convolution 57 opposite the lower end convolution 51, and five intermediate convolutions 52-56 that helically spiral between the lower end convolution 51 and the upper end convolution 57. Unlike the coil spring 10 shown in FIG. 1, however, the five intermediate convolutions 52-56 in the coil spring 40 do not include diameters that are substantially equal to one another. Rather, in the coil spring 40, the helical intermediate convolutions 52-56 are divided into a first portion 42 of helical intermediate convolutions having a first diameter and a second portion 46 of helical intermediate convolutions having a second diameter that is less than the first diameter.

In particular, in the coil spring 40, the first portion 42 of helical intermediate convolutions includes the first helical intermediate convolution 52, the third helical intermediate convolution 54, and the fifth helical intermediate convolution 56 of the coil spring 40, where the diameters of the first helical intermediate convolution 52, the third helical intermediate convolution 54, and the fifth helical intermediate convolution 56 are substantially equal to one another. In the exemplary coil spring 40 shown in FIG. 3, the first helical intermediate convolution 52, the third helical intermediate convolution 54, and the fifth helical intermediate convolution 56 of the first portion 42 all have a diameter of about 80 mm. The second portion 46 of helical intermediate convolutions then includes the second helical intermediate convolution 53 and the fourth intermediate convolution 55 of the coil spring, where the diameters of the second helical intermediate convolution 53 and the fourth intermediate convolution 55 are substantially equal to one another. In the exemplary coil spring 40 shown in FIG. 3, the second helical intermediate convolution 53 and the fourth intermediate convolution 55 of the second portion 46 both have a diameter of about 50 mm. The diameters of the second helical intermediate convolution 53 and the fourth intermediate convolution 55 are not only substantially equal to one another, but are also substantially equal to the diameter of the lower end convolution 51 and the upper end convolution 57 of the coil spring. In this way, each of the helical intermediate convolutions 52, 54, 56 included in the first portion 42 of helical intermediate convolutions are thus arranged in an alternating pattern with each of the helical intermediate convolutions 53, 55 in the second portion 46 of helical intermediate convolutions and with the lower end convolution 51 and the upper end convolution 57.

In the coil spring 40, due to the larger diameters, each of the helical intermediate convolutions 52, 54, 56 included in the first portion 42 is less than the spring constant of each of the helical intermediate convolutions 53, 55 in the second portion 46. As such, and although not shown in FIG. 3, when the coil spring 40 is initially compressed a predetermined distance, each helical intermediate convolution 52, 54, 56 included in the first portion 42 of helical intermediate convolutions will be the first of the helical intermediate convolutions 52-56 in the coil spring 40 to become deactivated (i.e., the helical intermediate convolutions 52, 54, 56 included in the first portion 42 will not be able to compress any further), while each of the helical intermediate convolutions 53, 55 in the second portion 46 will still be capable of additional compression. In other words, by including such an arrangement of helical intermediate convolutions 52-56 in the coil spring 40, upon compression, the coil spring 40 exhibits a variable loading response similar to the coil spring 10 described above with reference to FIGS. 1 and 2. Furthermore, and without wishing to be bound by any particular theory, it is believed that the alternating larger and smaller diameters in the coil spring 40 shown in FIG. 3 also serve to improve the stability of the coil spring 40, and thereby makes the coil spring 40 less prone to leaning upon application of a lateral force to the coil spring 40.

With further respect to the exemplary coil spring 40 shown in FIG. 3, in the coil spring 40, the pitches between each of the helical intermediate convolutions 52-56, the pitch between the lower end convolution 51 and the first helical intermediate convolution 52, and the pitch between the fifth helical intermediate convolution 56 and the upper end convolution 57 are substantially equal to one another. In particular, in the exemplary coil spring 40 shown in FIG. 3, the pitches between each of the helical intermediate convolutions 52-56, the pitch between the lower end convolution 51 and the first helical intermediate convolution 52, and the pitch between the fifth helical intermediate convolution 56 and the upper end convolution 57 are about 30 mm.

Similar to the coil spring 10 described above with reference to FIG. 1, in the coil spring 40 shown in FIG. 3, the pitch between the lower end convolution 51 and the first helical intermediate convolution 52 can be slightly less than the pitch between the first helical intermediate convolution 52 and the second helical intermediate convolution 53 as the continuous wire 50 of the coil spring 40 transitions from the generally planar lower end convolution 51 to the helically spiraling first helical intermediate convolution 52. Similarly, the pitch between the fifth helical intermediate convolution 56 and the upper end convolution 57 can be slightly less than the pitch between the fourth helical intermediate convolution 55 and the fifth helical intermediate convolution 56 as the continuous wire 50 of the coil spring 40 transitions from the helically spiraling fifth helical intermediate convolution 56 to the generally planar upper end convolution 57. It is of course contemplated that the pitches between any of the helical intermediate convolutions 52-56 in the coil spring 40 could also be varied as desired to provide further customization of the spring constants and loading responses of the coil spring 40.

Figure 4:
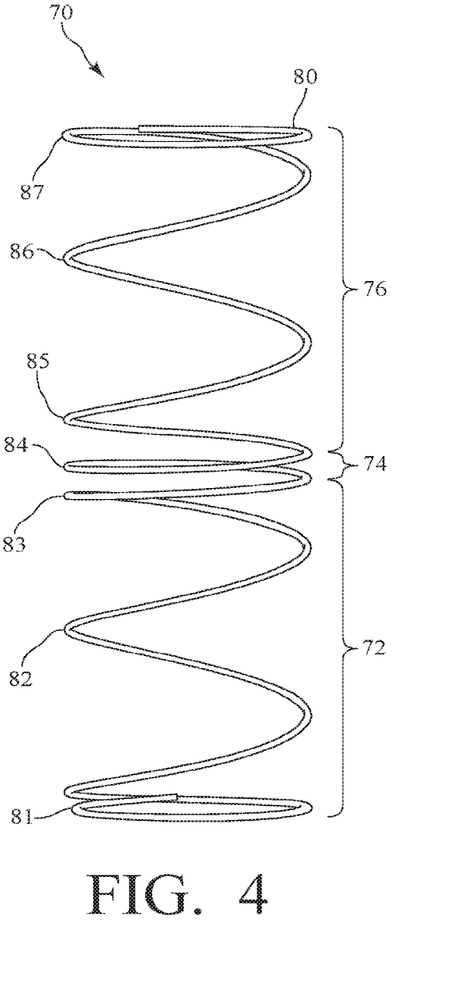
FIG. 4 is a perspective view of another exemplary coil spring made in accordance with the present invention.

As a further refinement to the present invention, and referring now to FIG. 4, in another exemplary embodiment of the present invention, a coil spring 70 is provided that is also comprised of a continuous wire 80 forming a lower end convolution 81, an upper end convolution 87 opposite the lower end convolution 81, and five intermediate convolutions 82-86 which helically spiral between the lower end convolution 81 and the upper end convolution 87. Unlike the coil springs 10, 40 shown in FIGS. 1-3, however, the lower end convolution 81, the upper end convolution 87, and the five intermediate convolutions 82-86 of the coil spring 70 are arranged such that the coil spring 10 is divided into a lower portion 72 that includes the lower end convolution 81 and the first intermediate convolution 82, a central portion 74 which includes the second intermediate convolution 83 and the third intermediate convolution 84, and an upper portion 76 that includes the fourth intermediate convolution 85, the fifth intermediate convolution 86, and the upper end convolution 87.

As shown in FIG. 4, the diameters of the lower end convolution 81 and first helical intermediate convolution 82 of the lower portion 72, the diameters of the second helical intermediate convolution 83 and the third helical intermediate convolution 84 of the central portion 74, and the diameters of the fourth helical intermediate convolution 85, the fifth helical intermediate convolution 86, and the upper end convolution 87 of the upper portion 76 are all substantially equal to one another. In particular, in the exemplary coil spring 70 shown in FIG. 4, the diameters of the lower end convolution 81, the first helical intermediate convolution 82, the second helical intermediate convolution 83, the third helical intermediate convolution 84, the fourth helical intermediate convolution 85, the fifth helical intermediate convolution 86, and the upper end convolution 87 are about 60 mm. However, in the coil spring 70, the pitch between the lower end convolution 81 and the first helical intermediate convolution 82, the pitch between the first helical intermediate convolution 82 and the second helical intermediate convolution 83, the pitch between the fourth helical intermediate convolution 85 and the fifth helical intermediate convolution 86, and the pitch between the fifth helical intermediate convolution 86 and the upper end convolution 87 are substantially equal to one another, while the pitch between the second helical intermediate convolution 83 and the third helical intermediate convolution 84 is substantially smaller. In particular, in the exemplary coil spring 70 shown in FIG. 4, the pitch between the lower end convolution 81 and the first helical intermediate convolution 82, the pitch between the first helical intermediate convolution 82 and the second helical intermediate convolution 83, the pitch between the fourth helical intermediate convolution 85 and the fifth helical intermediate convolution 86, and the pitch between the fifth helical intermediate convolution 86 and the upper end convolution 87 are all about 40 mm and the pitch between the second helical intermediate convolution 83 and the third helical intermediate convolution 84 is about 10 mm. Accordingly, when the coil spring 70 is initially compressed a predetermined distance (not shown), the central portion 74 of the coil spring 70 will first become deactivated (i.e., not capable of further compression), while the upper portion 76 and the lower portion 72 of the coil spring will still be capable of additional compression, which, in turn, leads to a variable loading response in the coil spring 70 similar to that exhibited by the coil springs 10, 40 described above with reference to FIGS. 1-3.

Similar to the coil springs 10, 40 described above with reference to FIGS. 1 and 3, in the coil spring 70 shown in FIG. 4, the pitch between the lower end convolution 81 and the first helical intermediate convolution 82 can be slightly less than the pitch between the first helical intermediate convolution 82 and the second helical intermediate convolution 83 as the continuous wire 80 of the coil spring 70 transitions from the generally planar lower end convolution 81 to the helically spiraling first helical intermediate convolution 82. Similarly, the pitch between the fifth helical intermediate convolution 86 and the upper end convolution 87 is slightly less than the pitch between the fourth helical intermediate convolution 85 and the fifth helical intermediate convolution 86 as the continuous wire 80 of the coil spring 70 transitions from the helically spiraling fifth helical intermediate convolution 86 to the generally planar upper end convolution 87.

Figure 5:
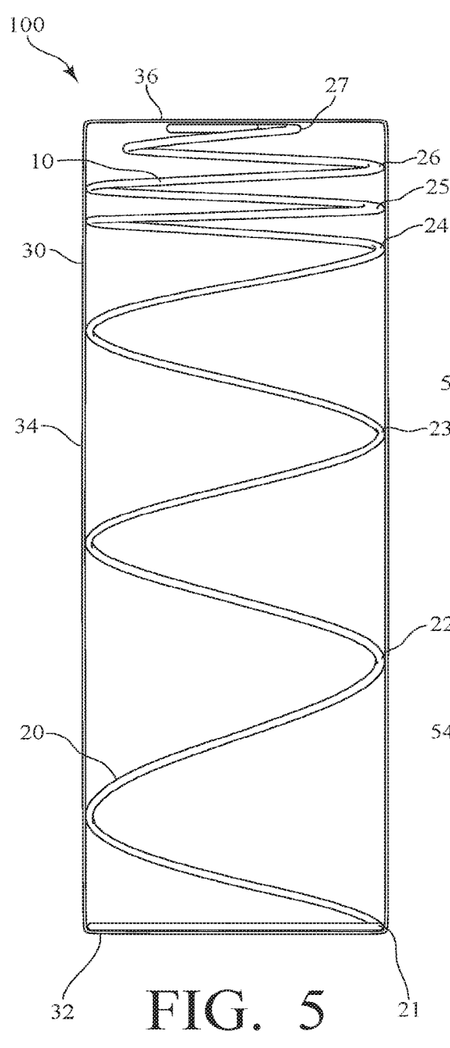
FIG. 5 is a side view of the exemplary coil spring of FIG. 1 enclosed within a fabric pocket, and with a portion of the fabric pocket removed to show the coil spring of FIG. 1.

As an even further refinement to the coil springs of the present invention, each of the coil springs can also be enclosed by a flexible enclosure (e.g., a fabric pocket) to thereby form a pocketed coil spring. For example, and referring now to FIG. 5, in one embodiment of the present invention, a pocketed coil spring 100 is provided that includes a coil spring 10 as described above with reference to FIGS. 1 and 2, and that further comprises a flexible enclosure 30 enclosing the continuous wire 20 forming the coil spring 10. The flexible enclosure 30 includes a bottom wall 32 positioned adjacent to the lower end convolution 21 of the coil spring 10, a top wall 36 positioned adjacent to the upper end convolution 27 of the coil spring 10, and a continuous side wall 34 that extends from the bottom wall 32 to the top wall 36, such that the continuous side wall 34 surrounds the helical intermediate convolutions 22-26 of the coil spring 10. To this end, the diameter of the lower end convolution 21 as well as the diameter of each of the helical intermediate convolutions 22-26 is generally substantially the same as the diameter of the flexible enclosure 30 and, therefore, the lower end convolution 21 and each of the helical intermediate convolutions 22-26 contact the side wall 34 of the flexible enclosure 30. As such, upon gluing or otherwise connecting the side wall 34 of the flexible enclosure 30 to the lower end convolution 21 and/or to each of the helical intermediate convolutions 22-26, an adequate connection is provided between the coil spring 10 and the flexible enclosure 30, such that the flexible enclosure 30 does not shift its position relative to the coil spring 10 when the pocketed coil spring 100 is compressed.

Figure 6:
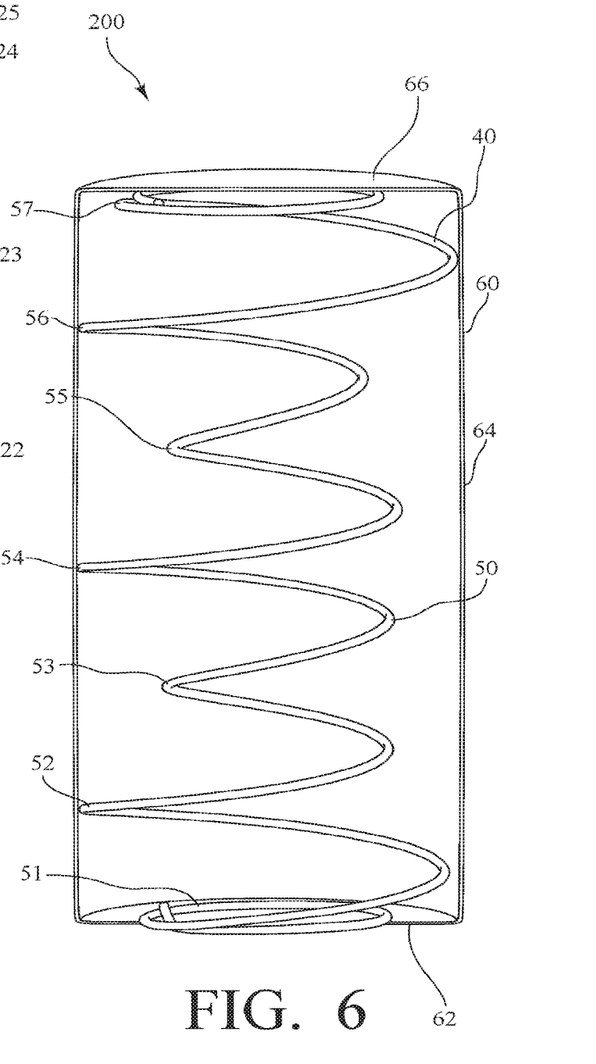
FIG. 6 is a perspective view of the exemplary coil spring of FIG. 3 enclosed within a fabric pocket, and with a portion of the fabric pocket removed to show the coil spring of FIG. 3.

As another example of a pocketed coil spring made in accordance with the present invention, and referring now to FIG. 6, in another embodiment of the present invention, a pocketed coil spring 200 is provided that includes a coil spring 40 as described above with reference to FIG. 3, and that further comprises a flexible enclosure 60 enclosing the coil spring 40. The flexible enclosure 60 similarly includes a bottom wall 62 positioned adjacent to the lower end convolution 51 of the coil spring 40, a top wall 66 positioned adjacent to the upper end convolution 57 of the coil spring 40, and a continuous side wall 64 that extends from the bottom wall 62 to the top wall 66, such that the continuous side wall 64 surrounds the helical intermediate convolutions 52-56. In this regard, and as shown in FIG. 6, the diameters of the second helical intermediate convolution 53 and the fourth helical intermediate convolution 55 are each less than the diameter of the flexible enclosure 60, while the diameters of the first helical intermediate convolution 52, the third helical intermediate convolution 54, and the fifth helical intermediate convolution 56 are greater and contact the flexible enclosure 60 to provide an adequate connection between the coil spring 40 and the flexible enclosure 60 and to help ensure that the flexible enclosure 60 does not shift its position relative to the coil spring 40 when the pocketed coil spring 200 is compressed.

Figure 7:
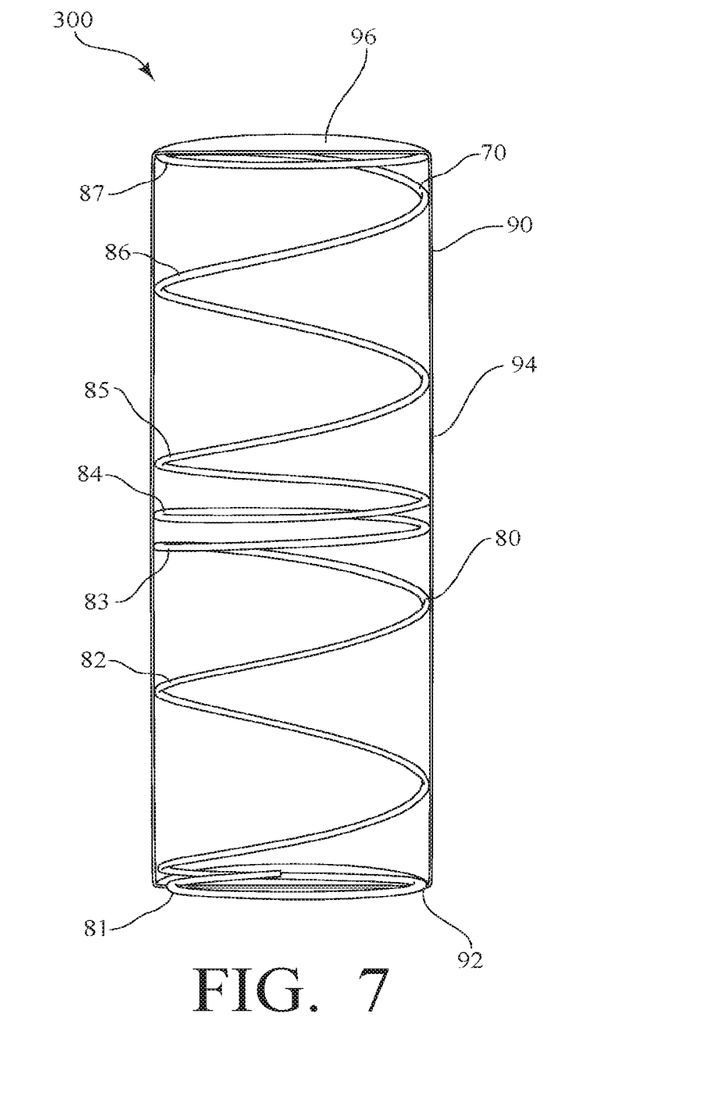
FIG. 7 is a perspective view of the exemplary coil spring of FIG. 4 enclosed within a fabric pocket, and with a portion of the fabric pocket removed to show the coil spring of FIG. 4.

As an even further example of a pocketed coil spring made in accordance with the presently-disclosed subject matter, and referring now to FIG. 7, in another embodiment of the present invention, a pocketed coil spring 300 is provided that includes a coil spring 70 as described above with reference to FIG. 4, and that further comprises a flexible enclosure 90 that encases the continuous wire 80 forming the coil spring 70. The flexible enclosure 90 similarly includes a bottom wall 92 positioned adjacent to the lower end convolution 81 of the coil spring 70, a top wall 96 positioned adjacent to the upper end convolution 87 of the coil spring 70, and a continuous side wall 94 that extends from the bottom wall 92 to the top wall 96, such that the continuous side wall 94 surrounds the helical intermediate coils 82-86 of the coil spring. In this regard, and because the diameters of each the of the convolutions 81-87 of the coil spring 70 (i.e., the lower end convolution 81, the upper end convolutions 87, and all of the intermediate convolutions 82-86) are substantially equal to one another and are thus the same as the diameter of the flexible enclosure 90, the flexible enclosure 90 can be glued or otherwise connected to all of the convolutions 81-87 to provide a more extensive connection between the continuous wire 80 of the coil spring 70 and the flexible enclosure 90. Furthermore, the smaller pitch between the second helical intermediate convolution 83 and the third helical intermediate convolution 84 of the coil spring 70 provides an advantageously uniform surface upon which to form a glue joint. That is to say, the close spacing of the second helical intermediate convolution 83 and the third helical intermediate convolution 84 of the coil spring 70 facilitates bonding the flexible enclosure 90 to that portion of the coil spring 70.

Regardless of the particular configuration of the exemplary coil springs or pocketed coil springs of the present invention, in some embodiments, each of the coil springs, including each of the pocketed coil springs described herein, can further be included in a mattress to provide a user with the non-linear support typically seen in a foam mattress, but through the use of coil springs. For example, and referring now to FIG. 8, in another embodiment of the present invention, a mattress 400 is provided that includes a plurality of the pocketed coil springs 100 described above with reference to FIG. 5. The pocketed coil springs 100 included in the mattress 400 are arranged in a matrix, such that the upper end convolution 27 formed by the continuous wire 20 in each of the coil springs 100 defines a first support surface 401, and the lower end convolution 21 formed by the continuous wire 20 defines a second support surface 402 opposite the first support surface 401. The mattress 400 also comprises an upper body supporting layer 403 positioned adjacent to the first support surface 401, along with a lower foundation layer 404 positioned adjacent to the second support surface 402. Furthermore, a sidewall 405 extends between the upper body supporting layer 403 and the lower foundation layer 404 around the entire periphery of the two layers 403, 404, such that the matrix of pocketed coil springs 100 is completely surrounded.

Figure 8:
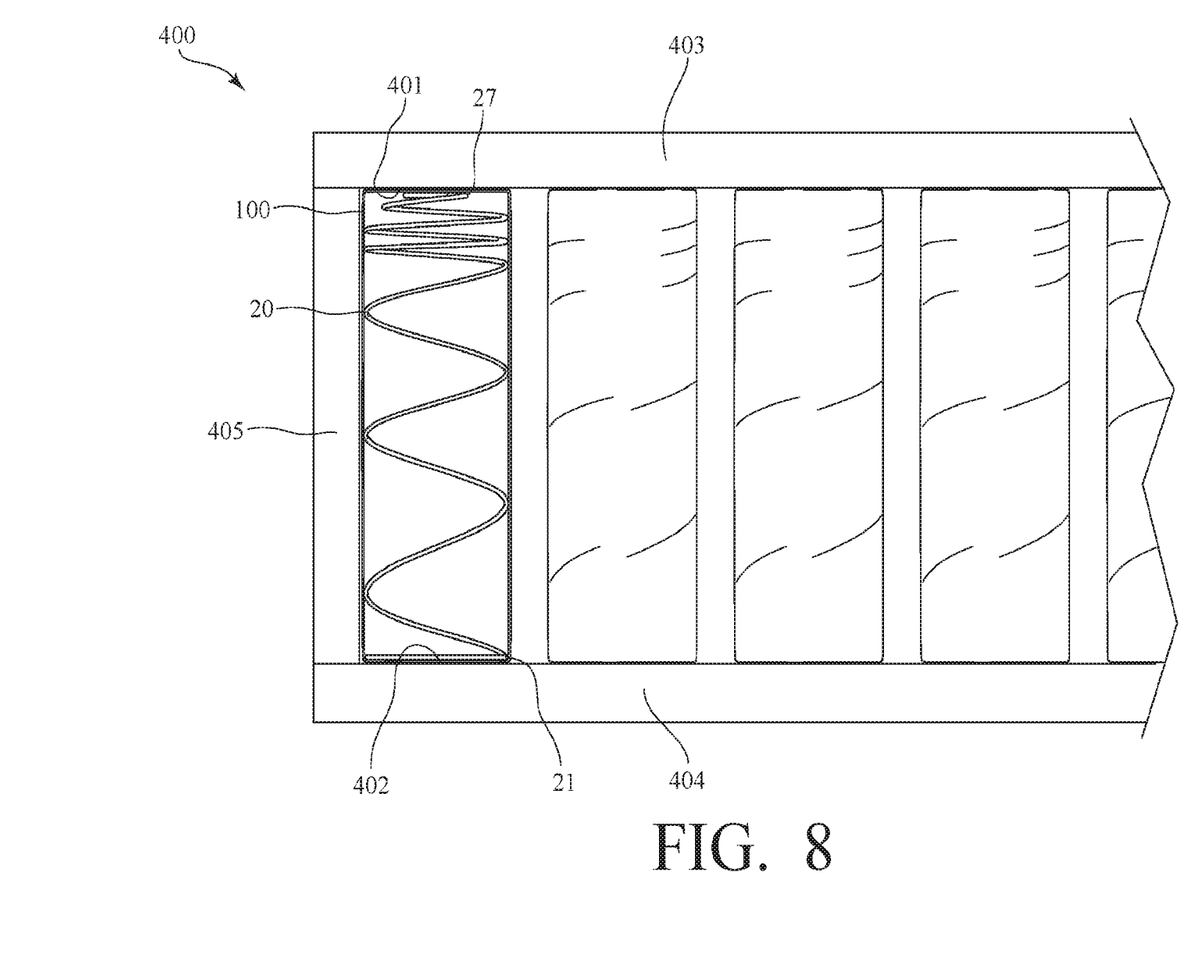
FIG. 8 is a cross-sectional view of an exemplary mattress made in accordance with the present invention, and showing a plurality of coil springs of FIG. 1 arranged in a matrix and enclosed within fabric pockets.

In the mattress 400 shown in FIG. 8, the upper body supporting layer 403 and the sidewall 405 of the mattress 400 are each comprised of a visco-elastic foam to support the body of a user and provide a sufficiently soft surface on which to rest. The lower foundation layer 404, on the other hand, is typically comprised of a piece of wood or other similarly rigid material capable of supporting the matrix of pocketed coil springs 100. However, it is of course contemplated that the upper body supporting layer 403 and the sidewall 405 of the mattress 400, as well as the lower foundation layer 404, can also be comprised of other materials or combinations of materials known to those skilled in the art, including, but not limited to foam, upholstery, and/or other flexible materials.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A mattress, comprising:
a plurality of coil springs arranged in a matrix and defining a first support surface and a second support surface opposite the first support surface, each of the plurality of coil springs comprised of a continuous wire having a length and forming an upper end convolution, and a lower end convolution opposite the upper end convolution, and a plurality of helical intermediate convolutions between the upper end convolution and the lower end convolution, said plurality of helical intermediate convolutions having an upper portion having a plurality of upper convolutions and a lower portion having a plurality of lower convolutions;
the upper end convolution having a diameter, the lower end convolution having a diameter, and each of the plurality of helical intermediate convolutions having a respective diameter, and
the continuous wire defining a pitch between each one of the plurality of helical intermediate convolutions, a pitch between the upper end convolution and the plurality of helical intermediate convolutions adjacent the upper end convolution, and a pitch between the lower end convolution and the plurality of helical intermediate convolutions adjacent the lower end convolution,
wherein at least one of the pitches is different than another one of the pitches or at least one of the diameters is different from another one of the diameters such that the each of the plurality of coil springs exhibits a non-linear loading response upon compression;
a fabric pocket enclosing each of the plurality of coil springs;
wherein the plurality of helical intermediate convolutions in the lower portion comprise a first helical intermediate convolution, a second helical intermediate convolution, and a third helical intermediate convolution of the continuous wire;
wherein the plurality of helical intermediate convolutions in the upper portion comprise a fourth helical intermediate convolution and a fifth helical intermediate convolution of the continuous wire;
wherein the pitch between the lower end convolution and the first helical intermediate convolution, the pitch between the first helical intermediate convolution and the second helical intermediate convolution, the pitch between the third helical intermediate convolution and the fourth helical intermediate convolution, the pitch between the fourth helical intermediate convolution and the fifth helical intermediate convolution, and the pitch between the fifth helical intermediate convolution and the upper end convolution are substantially equal.

2. The mattress of claim 1, further comprising:
an upper body supporting layer positioned adjacent to the first support surface;
a lower foundation layer positioned adjacent to the second support surface; and
a side panel extending between the upper body supporting layer and the lower foundation layer.

3. The mattress of claim 1, wherein each of the pitches in the lower portion is greater than each of the pitches in the upper portion.

4. The mattress of claim 1, wherein the diameters of the plurality of helical intermediate convolutions in the upper portion are equal to the diameters of the plurality of helical intermediate convolutions in the lower portion and to the diameter of the lower end convolution, and
wherein the diameter of the upper end convolution is less than each diameter of the plurality of helical intermediate convolutions in the upper portion.

5. The mattress of claim 1, wherein the diameter of the lower end convolution and the diameter of the upper end convolution are both equal.

6. The mattress of claim 1, wherein the diameters of the lower end convolution and the one or more of the plurality of helical intermediate convolutions of the lower portion, the diameters of at least two of the plurality of helical intermediate convolutions of a central portion, and the diameters of the upper end convolution and the one or more of the plurality of helical intermediate convolutions of the upper portion are substantially equal.

7. The mattress of claim 1, wherein the pitch between at least two of the plurality of helical intermediate convolutions of a central portion is less than each of the pitches in the lower portion and the upper portion of the continuous wire.

8. The mattress of claim 7, wherein the lower portion comprises a first helical intermediate convolution of the continuous wire, the central portion comprises a second helical intermediate convolution and a third helical intermediate convolution of the continuous wire, and the upper portion comprises a fourth helical intermediate convolution and a fifth helical intermediate convolution of the continuous wire.

9. The mattress of claim 8, wherein the pitch between the lower end convolution and the first helical intermediate convolution, the pitch between the first helical intermediate convolution and the second helical intermediate convolution, the pitch between the fourth helical intermediate convolution and the fifth helical intermediate convolution, and the pitch between the fifth helical intermediate convolution and the upper end convolution are substantially equal.

* * * * *